April 28, 1925.
B. E. RICHARDSON ET AL
1,535,790
TRANSMISSION GEARING CLUTCH
Filed Dec. 5, 1921
2 Sheets-Sheet 1
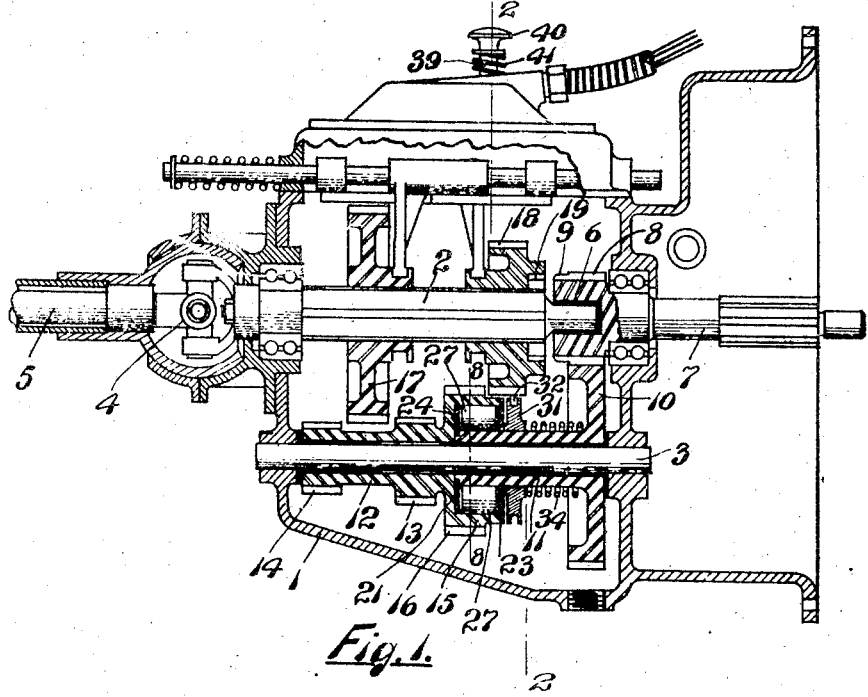
Fig.1.
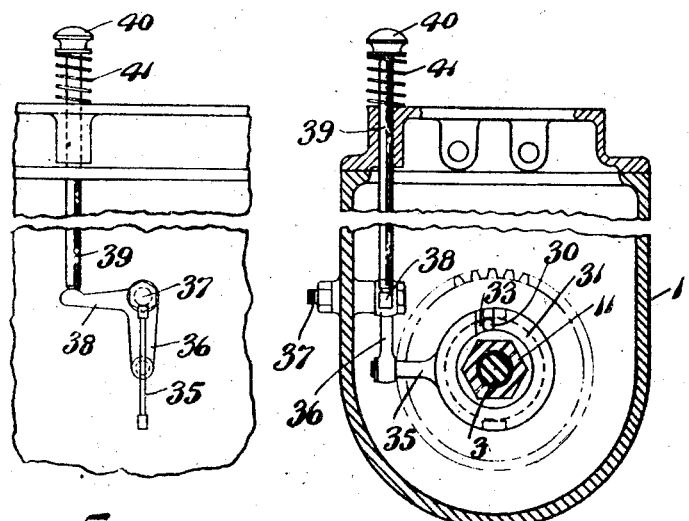
Fig.3.
Fig.2.
Inventors
Bayard E. Richardson
Alger M. Lynn
By Frank E. Liverance, Jr.
Attorney

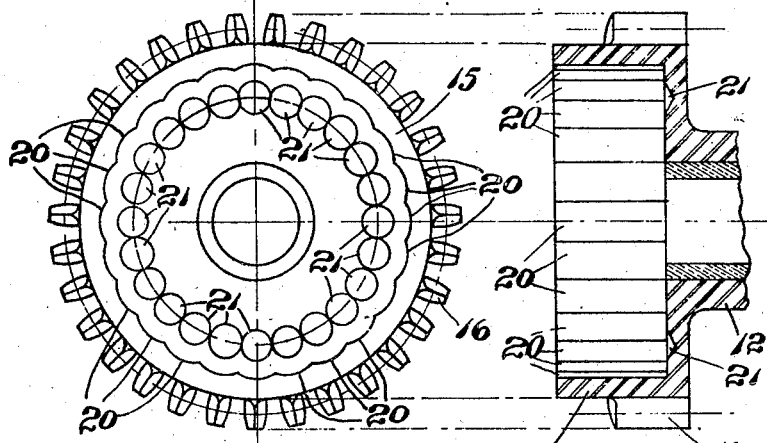
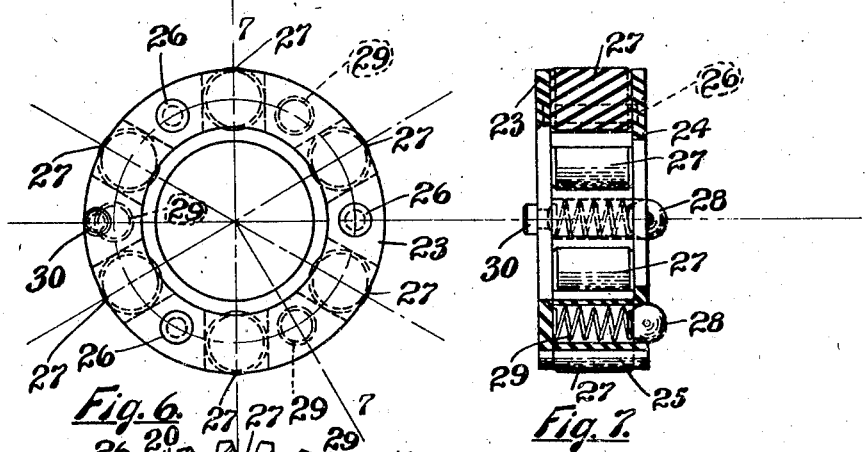
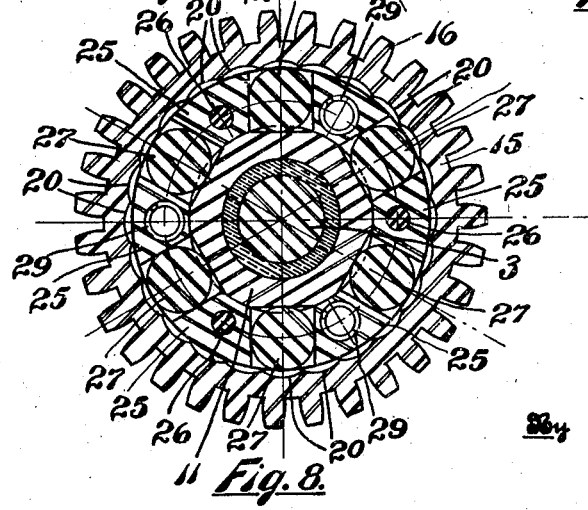

Patented Apr. 28, 1925.

1,535,790

UNITED STATES PATENT OFFICE.

BAYARD E. RICHARDSON AND ALGER M. LYNN, OF GRAND RAPIDS, MICHIGAN, ASSIGNORS TO MECHANO GEAR SHIFT COMPANY, OF GRAND RAPIDS, MICHIGAN, A CORPORATION OF MICHIGAN.

TRANSMISSION-GEARING CLUTCH.

Application filed December 5, 1921. Serial No. 519,878.

*To all whom it may concern:*

Be it known that we, BAYARD E. RICHARDSON and ALGER M. LYNN, citizens of the United States of America, residing at Grand Rapids, in the county of Kent and State of Michigan, have invented certain new and useful Improvements in Transmission-Gearing Clutches; and we do hereby declare the following to be a full, clear, and exact description of the invention, such as will enable others skilled in the art to which it appertains to make and use the same.

This invention relates to a motor vehicle transmission mechanism, and particularly to a novel construction of clutch used in combination therewith. The present invention is an improvement in the construction shown in a prior application for patent, Ser. No. 360,928, filed Feb. 24, 1920, by Bayard E. Richardson, which has matured into Patent No. 1,413,058, embodying all of the advantages shown and described in said application, together with many in addition. In such prior construction, the transmission mechanism is disconnected, not only from the engine but also from the rear axle of the vehicle when a shift of gearing is to take place, so that the transmission is not driven by the engine nor by the momentum of the vehicle. An overrunning clutch is made use of in the mechanism of the transmission which automatically overruns when the momentum of the vehicle tends to drive the transmission. When the engine is driving the transmission, however, the clutch does not overrun but connects so as to drive the vehicle. Owing to the severe usage to which this clutch is subjected in service, it is necessary that it be very strongly made and in such manner that it will act at all times, and it is to these ends that the present invention is mainly directed. The invention consists in various novel features of construction, together with novel means for controlling the action of the same so that it may be rendered inoperative in so far as its overrunning features are concerned when the vehicle is to be braked through the engine compression, whereby a simple, positive, and very durable and practical clutch of the overrunning type is produced for attaining the ends stated, together with many others not at this time specifically outlined, but which will appear as understanding of the invention is had from the following description, taken in connection with the accompanying drawings, in which, Fig. 1 is a longitudinal vertical section taken through a transmission mechanism equipped with my invention.

Fig. 2 is a vertical transverse section therethrough, on the plane of line 2—2, of Fig. 1, parts of the construction showing in said section being omitted for better disclosure.

Fig. 3 is a fragmentary elevation looking against one of the inner sides of the transmission casing.

Fig. 4 is an elevation of a member comprising one of the clutch parts and a gear formed integral therewith.

Fig. 5 is a central vertical section therethrough.

Fig. 6 is an elevation of the inner or roller cage member of the clutch.

Fig. 7 is a transverse section therethrough substantially on the plane of the broken line 7—7 of Fig. 6, and Fig. 8 is a vertical transverse section through the assembled clutch, on the line 8—8, of Fig. 1.

Like reference characters refer to like parts in the different figures of the drawings.

The transmission casing 1 is of conventional design in which an upper main transmission shaft 2 is rotatably mounted lengthwise of the casing, below which a rod 3 is mounted in parallelism with the main shaft, its ends being carried by the ends of the casing. The rear end of the shaft 2 is connected by means of a universal joint 4 with the propeller shaft 5 of the motor vehicle in which the transmission is installed. The front end of the shaft 2 is loosely mounted in the rear enlarged end 6 of a shaft 7 located in front of the shaft 2 and in alinement therewith, said shaft 7 being in alinement with the crank shaft of the engine and adapted to be detachably connected thereto by the usual clutch used with motor vehicles. The rear end or head 6 of shaft 7 has a gear 8 and clutch part 9 formed thereon with the first of which a gear 10 is in engagement, gear 10 being formed at the end of a hexagonally shaped sleeve 11, loosely mounted on the rod 3. A second sleeve 12 is loosely mounted on the rod 3 in alinement with and back of the sleeve 11 on which two pinions 13 and 14 are formed, spaced a distance apart while at its front end, sleeve 12 is enlarged and formed into an outer clutch member 15 of substantially cylindrical form open at its front end and into which the rear end of the hexagonal sleeve 11 extends. A gear 16 is formed around the outer side of the clutch member 15.

Two gears 17 and 18 are splined on the shaft 2, the former of which is adapted to be shifted into engagement with pinion 13 or with an idler reversing pinion which is in mesh with pinion 14, such idler pinion not being shown but being well known to all familiar with sliding gear transmissions. The gear 18 may be shifted into engagement with gear 16. In its forward movement a clutch part 19 on the same member on which gear 18 is cut meshes with the clutch part 9 heretofore described. The usual three speeds forward and one reverse is designed to be had with this transmission construction.

On the inner curved sides of the outer clutch member 15, a series of concaved recesses 20 are made paralleling each other and the length of the member, there being twenty four of such recesses in the construction shown, though this number is not necessarily the only number of recesses that can be used. With the hexagonal sleeve 11, it is desirable that a multiple of six recesses be used. In the bottom of the member 15 a like number of countersunk recesses 21 are formed, substantially tangent to each other, as shown, the use of which will later appear.

Within the outer clutch member and around the hexagonal sleeve 11 a roller carrying cage is located, the same including two rings 23 and 24 between which six sector shaped blocks 25 are located and permanently held in place by rivets 26 passing through the blocks and rings. The blocks are spaced apart having adjacent sides parallel, and in said spaces rollers 27 are positioned. When located within the outer clutch member and over the sleeve 11, as shown in Fig. 8, each of the rollers 27 comes against a side of the sleeve 11, its outer edge portion lying flush with the outer edges of the rings 23 and 24 so that the rollers 27 pass by the ridges between the concave depressions 20 in the outer clutch member so long as the rollers are located centrally with respect to their respective sides of the sleeve 11. But if the rollers are permitted to move away from such central position they are forced outward and enter the adjacent recesses 20 making a firm connection between the clutch members 15 and 11.

The rear ring 24 has a number of openings made therethrough, in which balls 28 are located which are normally forced to the rear by springs 29 seated in openings made through certain of the blocks 25. These balls are thus yieldingly pressed into certain of the countersunk recesses 21 and make a yielding latch engagement between the roller cage and the outer clutch member and have the effect of normally centrallizing the cage with respect to the outer clutch member so as to bring the rollers 27 directly opposite the depression 20 in the member 15.

A short pin or lug 30 is attached to and projects forward from the front ring 23 for engagement with a collar 31 splined on the shaft 11 in front of the ring 23. The collar has an annular groove 32 cut in and around the same and a transverse notch or recess 33 at one side into which the lug 30 extends. This notch is wider than the diameter of the lug so that the roller cage may have a limited movement with respect to the collar when the lug is engaged therewith. When the pin is engaged against one side of the notch, the rollers 27 are centrally located with respect to the sides of the sleeve 11 and the inner clutch sleeve member 11 and the roller cage may turn freely within the outer clutch member 15 except that the spring actuated balls 28 furnish some resistance which is readily overcome. When the lug is at the opposite side of the notch, the sleeve 11 has moved sufficiently that the rollers 27 are forced outward into certain of the concave recesses 20 and a secure connection of the two clutch members made. This is designed to occur when the engine is driving the vehicle at its low, intermediate and reverse speeds, it being evident that at high direct forward speed the action of the clutch is not of importance as it does not come into service for high speed. At the time that the gears are changed in the transmission, however, with the gearing for a time in neutral, or when the gears are changed from reverse or any of the lower speeds to a forward speed or one higher, as soon as the engine is disconnected from the transmission, with the gears still in engagement, the normal tendency for the propeller shaft 5 of the vehicle to drive the transmission from the rear is counteracted by reason of the free rotation of the outer clutch member around the roller cage, thereby eliminating serious strains which would otherwise occur.

The collar 31 is forced toward the roller cage by a spring 34 around the sleeve 11. There are times when the roller clutch should be effective irrespective of the fact that normally it is not desirable that the transmission shall be driven by the momentum of the vehicle. This is when the gearing is connected for either low or intermediate speed and the vehicle is going down a grade, there being a connection through to the engine required in order to have the engine serve as a brake against too fast movement of the vehicle. In such case the collar 31 is moved forward to disconnect entirely from the lug 30 permitting the clutch to connect where otherwise it is held from connection in one direction of movement.

A yoke 35 is seated in the groove 32 of the collar and has a connection at its outer end to one arm 36 of a bell-crank lever which is pivotally mounted on a stud 37 projecting inwardly from a side of the transmission casing 1. The other arm 38 of the bell-crank lever is normally horizontal, against the upper side of which at its free end the lower end of a vertical rod 39 bears. This rod extends upwardly through the cover of the casing 1 and is slidably mounted therethrough, being equipped at its upper end with a head 40, between which and the upper side of the casing cover, a spring 41 is located tending to elevate the rod. The upper end of the rod with the head 40 extends above the floor board of the driver's compartment of the vehicle so that the driver may depress the rod by use of the foot, thereby moving the collar 30 to inoperative position.

By reason of the novel construction of clutch shown and described, a clutch is provided which is very positive and sure in its action, and one which stands up for a long time under severe usage. By reason of the concave recesses 20 for reception of the rollers, the pressure is distributed over a greater surface of each roller rather than on a line with greater insurance against crushing the roller or flattening it at points where pressure occurs. The spring actuated latch balls 28 are of value in automatically positioning the parts in proper relation and also serve as an insurance against jumping of the rollers at or about the time of engagement thereof with the outer clutch member over the ridges between the concaved depressions 20, with consequent undesirable noise and grating of the rollers over such ridges. The construction has been put to severe test in service and has proved particularly durable and effective in all respects.

We claim:

1. A clutch comprising an outer cylindrical member of substantially cup-like form, an inner member located within the outer member and having a plurality of sides located at an angle to each other, a cage around the inner member and within the outer member, loosely mounted rollers carried by the cage, one between each side of the inner member and the inner sides of the outer member, and spring actuated balls carried by the cage, said outer member on its inner side and in the bottom of the same having a consecutive series of ball-receiving depressions into which the balls are yieldably pressed.

2. A clutch comprising an outer cylindrical member of substantially cup-like form, provided with a consecutive series of longitudinal concaved depressions on its inner curved sides and with a consecutive series of countersunk depressions on its inner flat side, a roller carrying cage located within the outer member, an inner clutch member extending through the cage and having a plurality of sides located at an angle to each other, a plurality of rollers, one for each side of the inner member loosely carried by said cage and adapted to enter a concaved depression on the inner curved sides of the outer member on turning movement of the inner clutch member, balls at one side of the cage adapted to enter the countersunk depressions, and springs carried by the cage acting on the balls to force them into said depressions.

3. A clutch comprising an inner member having a plurality of sides arranged at angles to each other, a roller carrying cage around the inner member including clutch rollers loosely carried therein, one at each side of the inner member, an outer clutch member of cup-like form located over the cage and inner member and provided with a plurality of depressions on its inner side and having a plurality of ball receiving recesses in its bottom, and spring actuated balls carried by the cage and pressed into said recesses.

4. A clutch comprising an inner member having a plurality of sides arranged at angles to each other, a roller carrying cage around the inner member including clutch rollers loosely carried therein, one at each side of the inner member, an outer clutch member of cup-like form located over the cage and inner member and provided with a plurality of depressions on its inner side, in number a multiple of the number of rollers carried by the cage, and also having a series of ball receiving recesses in its bottom equal in number to the number of depressions, and spring actuated balls carried by the cage and pressed into said recesses.

In testimony whereof we affix our signatures.

BAYARD E. RICHARDSON.
ALGER M. LYNN.